United States Patent
Nunn et al.

(10) Patent No.: US 9,047,518 B2
(45) Date of Patent: Jun. 2, 2015

(54) METHOD FOR THE DETECTION AND TRACKING OF LANE MARKINGS

(71) Applicant: DELPHI TECHNOLOGIES, INC., Troy, MI (US)

(72) Inventors: Christian Nunn, Huckeswagen (DE); Mirko Meuter, Erkrath (DE); Dennis Mueller, Erkrath (DE); Steffen Goermer, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 361 days.

(21) Appl. No.: 13/650,182

(22) Filed: Oct. 12, 2012

(65) Prior Publication Data
US 2013/0208945 A1 Aug. 15, 2013

(30) Foreign Application Priority Data

Feb. 15, 2012 (EP) ..................................... 12000978

(51) Int. Cl.
*G06K 9/00* (2006.01)
*G06K 9/32* (2006.01)

(52) U.S. Cl.
CPC .... *G06K 9/00798* (2013.01); *G06K 2009/3291* (2013.01)

(58) Field of Classification Search
CPC ........... G06K 9/00798; G06K 9/00791; G06T 2207/30256
USPC ....................................................... 382/100
See application file for complete search history.

(56) References Cited

U.S. PATENT DOCUMENTS

| 6,819,779 | B1* | 11/2004 | Nichani | 382/104 |
|---|---|---|---|---|
| 2005/0069207 | A1* | 3/2005 | Zakrzewski et al. | 382/190 |
| 2005/0135658 | A1* | 6/2005 | Yamamoto et al. | 382/104 |
| 2005/0256636 | A1* | 11/2005 | Miyashita et al. | 701/207 |
| 2005/0273264 | A1* | 12/2005 | Gern et al. | 701/301 |
| 2005/0278098 | A1* | 12/2005 | Breed | 701/45 |
| 2006/0015252 | A1* | 1/2006 | Yamamoto et al. | 701/301 |

(Continued)

FOREIGN PATENT DOCUMENTS

| EP | 1596322 | 11/2005 |
|---|---|---|
| JP | 2004326214 | 11/2004 |

OTHER PUBLICATIONS

Vlacic Ljubo, et al: Intelligent vehicle technologies: theory and applications, Passages:, Jan. 1, 2001, Intelligent Vehicle Technologies: Theory and Applications, SAE International, US, pp. 157-166, XP002667070, ISBN: 978-0-7680-0.

(Continued)

*Primary Examiner* — Gandhi Thirugnanam
(74) *Attorney, Agent, or Firm* — Lawrence D Hazelton

(57) ABSTRACT

In a method for the detection and tracking of lane markings from a motor vehicle, an image of a space located in front of the vehicle is captured by means of an image capture device at regular intervals. The picture elements that meet a predetermined detection criterion are identified as detected lane markings in the captured image. At least one detected lane marking as a lane marking to be tracked is subjected to a tracking process. At least one test zone is defined for each detected lane marking. With the aid of intensity values of the picture elements associated with the test zone, at least one parameter is determined. The detected lane marking is assigned to one of several lane marking categories, depending on the parameter.

20 Claims, 4 Drawing Sheets

(56) References Cited

U.S. PATENT DOCUMENTS

| | | | |
|---|---|---|---|
| 2006/0078205 A1* | 4/2006 | Porikli et al. | 382/204 |
| 2006/0233424 A1* | 10/2006 | Miyajima et al. | 382/104 |
| 2008/0040004 A1* | 2/2008 | Breed | 701/45 |
| 2008/0061952 A1* | 3/2008 | Maass | 340/435 |
| 2008/0208460 A1* | 8/2008 | Nakao et al. | 701/208 |
| 2008/0291276 A1* | 11/2008 | Randler | 348/149 |
| 2009/0067675 A1* | 3/2009 | Tan et al. | 382/104 |
| 2009/0080704 A1* | 3/2009 | Mori et al. | 382/104 |
| 2009/0088966 A1* | 4/2009 | Yokoyama et al. | 701/201 |
| 2009/0167864 A1* | 7/2009 | Unoura | 348/148 |
| 2009/0169055 A1* | 7/2009 | Ishikawa | 382/104 |
| 2010/0121569 A1* | 5/2010 | Nakamura et al. | 701/208 |
| 2010/0172542 A1* | 7/2010 | Stein et al. | 382/103 |
| 2011/0196608 A1* | 8/2011 | Jansen et al. | 701/208 |
| 2012/0050074 A1* | 3/2012 | Bechtel et al. | 340/988 |
| 2013/0208945 A1* | 8/2013 | Nunn et al. | 382/103 |

OTHER PUBLICATIONS

Mirko Meuter, et al.: "A Decision Fusion and Reasoning Module for a Traffic Sign Recognition System", IEEE Transactions on Intelligent Transportation Systems, IEEE, Piscataway, NJ, US, Dec. 1, 2001, pp. 1126-1134, SPO11379323, ISSN: 1524-9050.

Zuwhan, Kim: "Robust Lane Detection and Tracking in Challenging Scenarios" IEEE Transactions on Intelligent Transportation Systems, IEEE, Piscataway, NJ, USA, vol. 9, No. 1, Mar. 1, 2008, pp. 16-26, XPO11205053, ISSN: 1524-9050.

Juan M Collado, et al.: "Multi-lane visual perception for lane departure warning systems", VISAPP 2008: Proceedings of the Third International Conference on Computer Vision Theory and Applications, vol. 2, Jan. 22, 2008, pp. 360-367, XP55031258, Madeira, Portugal ISBN: 978-9-89-811121-0.

Phillip Lindner, et al.: "Applying multi level processing for robust geometric lane feature extraction", Multisensor Fusion and Integration for Intelligent Systems (MFI), 2010 IEEE Conference on, IEEE, Piscataway, NJ, USA, Sep. 5, 2010, pp. 248-254, XPO31777439, ISBN: 978-1-4244-5424-2.

Stephanie Hold, et al.: "ELA—an exit lane assistant for adaptive cruise control and navigation systems", Intelligent Transportation Systems (ITSC), 2010 13th International IEEE Conference on, IEEE, Piscataway, NJ, USA, Sep. 19, 2010, pp. 629-634, XPO31792744, ISBN: 978-1-4244-7657-2.

Mirko Meuter, et al.: "A novel approach to lane detection and tracking", Intelligent Transportation Systems, 2009. ITSC '09. 12th International IEEE Conference on, IEEE, Piscataway, NJ, USA, Oct. 4, 2009, pp. 1-6, XPO31560119. ISBN 978-1-4244-5519-5.

Juan M Collado, et al.: "Adaptive Road Lanes Detection and Classification", Jan. 1, 2006, Advanced Concepts for Intelligent Vision Systems Lecture Notes in Computer Science;; LNCS, Springer, Berlin, DE, pp. 1151-1162, XP019043327, ISBN: 978-3-540-44630-9.

European Search Report dated Jul. 2, 2012.

* cited by examiner

US 9,047,518 B2

METHOD FOR THE DETECTION AND TRACKING OF LANE MARKINGS

CROSS-REFERENCE TO RELATED APPLICATION

This application claims the benefit under 35 U.S.C. §119 (a) of European Patent Application EP 12000978.2, filed Feb. 15, 2012, the entire disclosure of which is hereby incorporated herein by reference.

TECHNICAL FIELD OF INVENTION

This disclosure generally relates to detecting roadway lane markings, and more particularly relates to a method for the detection and tracking of lane markings from a motor vehicle equipped an image capture device.

BACKGROUND OF INVENTION

The tracking of lane markings is important for various kinds of driver assistance systems in modern motor vehicles. For example, a lane departure warning (LDW) can use the tracking of lane markings to determine the position of the vehicle within the lane and emits a warning signal if it gets too close to the edge of the lane. Lane keeping support (LKS) systems are also known. Such system supports the driver with keeping to the present lane by continuous steering, braking and/or drive train intervention.

Status estimators are used for approximate projection of a system status in the future, and are known in the field. Specifically, a status estimator used with the method according to the invention has a predictor-corrector structure.

In particular, in the case of simultaneous monitoring of a plurality of lanes, it is difficult to correctly detect all lane markings which are present in the image. This is because there are image objects which meet the detection criterion, but do not constitute valid lane markings. For example, crash barriers or tar seams can be detected as lane markings and falsely tracked. Erroneous tracking of this kind can considerably impair the performance of a driver assistance system.

SUMMARY OF THE INVENTION

What is needed is a method of the kind mentioned hereinbefore, that is more robust with respect to the detection of lane markings, and delivers reliable results in complex traffic situations.

In accordance with one embodiment, a method for the detection and tracking of lane markings from a motor vehicle on which an image capture device is mounted is provided. The image capture device is configured to capture an image of a space located in front of the vehicle. The image includes a plurality of picture elements captured by the image capture device at regular intervals. Picture elements of the image that meet a predetermined detection criterion are identified as detected lane markings in the captured image by an image processing system. At least one detected lane marking is identified as a lane marking to be tracked, and is subjected to a tracking process in which variation over time of the course of the lane marking in the plane of the roadway is tracked by means of a status estimator.

In another embodiment, at least one test zone comprising a plurality of picture elements of the image is defined for each detected lane marking. With the aid of intensity values of the picture elements associated with the test zone, at least one parameter is determined. The detected lane marking is assigned to one of a plurality of lane marking categories, depending on the parameter.

By division of the detected lane markings into various categories, unclear situations can be overcome as well. The parameter used as the assignment criterion can be any image characteristic that is determined based on the pixels of the test zone by means of simple computing operations or by means of complex image processing methods. It should be pointed out that the parameter is preferably independent of the detection criterion, that is, it serves for additional checking, particularly extended checking, of a previously detected lane marking. Different kinds of lane markings can therefore be distinguished from each other in a simple manner. In particular, the actual valid markings can be filtered out from all potential lane markings or marking candidates. The performance of the tracking system can therefore be increased appreciably.

According to another embodiment of the invention, each detected lane marking is subjected to the tracking process as a lane marking to be tracked or rejected as an invalid lane marking, depending on the lane marking category to which it is assigned. That is to say, verification of the detected lane markings takes place. As a result, "false candidates" such as crash barriers and tar seams may be excluded from tracking, which leads to greater robustness of the system.

The detected lane markings in each case may be assigned as a whole to the corresponding lane marking category. Alternatively, however, they may be assigned in sections. That is to say, the lane marking is divided into a plurality of sections along its course, each section on its own being assigned to a lane marking category. In this case, a section of a lane marking located close to the vehicle may be assigned to a different category from a section of the same lane marking further away from the vehicle. As a result, the robustness of the system may be further increased because in case of a restricted view or items being obscured. For example, a lane marking only in the region close to the vehicle is acknowledged as a lane marking to be tracked, whereas in the region further away it is refused or rejected, and so is characterized as invalid.

Preferably, the position of the test zone within the image is determined by converting the position of a tracked lane marking in the plane of the roadway at a predetermined distance from the vehicle to image coordinates by a projection method. A detected lane marking is in this way matched with lane markings already tracked, i.e. subjected to the tracking process.

According to another embodiment, from the intensity values of the picture elements associated with the test zone at least one statistical parameter is determined. Preferably, a plurality of statistical parameters is determined, for example an average intensity value, an intensity value total, a maximum intensity value, a minimum intensity value and/or at least one moment of intensity value distribution of the picture elements. The intensity values are typically the digital greyscale values or color values of the individual pixels of the image sensor. By statistical analysis of the extended test zone, reliable checking of the appearance of the detected lane marking and hence reliable division into categories are possible. For statistical analysis, Hu's moments, inclination, minimum or maximum gradient, histograms, quantiles of histograms and/or histograms of gradients may further also be used. It is recognized that characteristic parameters such as the width of a lane marking may also be used as parameters.

According to an embodiment of the invention, the parameter for a plurality of successive images is determined and the detected lane marking is assigned to the lane marking category in addition with the aid of the curve of the parameter in time. This allows further refined division into categories, as the time response of the parameter contains important information with respect to the appearance of the detected lane marking. For example, unbroken lane markings and broken lane markings may be distinguished particularly well with the aid of time analysis.

Preferably, the current speed of the vehicle is determined, wherein with the aid of the speed the curve of the parameter in time is converted to a curve of the parameter in space in the plane of the roadway, and wherein the detected lane marking is assigned to the lane marking category with the aid of the curve of the parameter in space. The parameter is therefore regarded as a function of the distance covered by the vehicle, which is more favorable with respect to assessment of the appearance of the lane marking. By looking at the parameter in the location, compensation of the vehicle's own movement may moreover be carried out particularly easily.

According to another embodiment, a statistical curve measure is determined for characterization of the curve of the parameter in time. In particular, the statistical curve measure may be based on an average, a standard deviation, or a variance. The detected lane marking is assigned to the lane marking category based in part on the statistical curve measure. Division of the detected lane markings into categories can thus be based on, for example, space statistics provided by the parameter and time statistics provided by the curve measure. This allows again extended analysis of the appearance of the lane marking to be checked. Characterization of the curve of the parameter in time can also be based on a sliding average and/or a filter.

The curve of the parameter over time can further be subjected to a time-frequency transform, in particular, a Fourier transform or a Haar transform. The detected lane marking is assigned to the lane marking category with the aid of the transform coefficients determined within the framework of the time-frequency transform. For example, the corresponding Fourier coefficients or Haar coefficients can serve as the statistical curve measures in the characterization of the curve of the parameter over time described above. An advantage of the Haar transform lies in that the associated calculations are quick and easy to do. The Haar transform is particularly well suited to the treatment of square functions. This accommodates the detection of broken lane markings.

The time-frequency transform can be carried out iteratively. That is to say, a moving time window is observed, where only new values are added and older values are weighted correspondingly. As a result, in particular the computing costs can be reduced.

Preferably, for each detected lane marking there is defined a set of several test zones that in each case correspond to the position of a tracked lane marking in the plane of the roadway at different distances from the vehicle. The lane marking is thus assessed not just in isolation at one point, but along its course. When defining the set of test zones, in particular a uniform distance between the positions of the tracked lane marking in the plane of the roadway can be selected.

According to another embodiment, for each detected lane marking at least 5 and preferably at least 15 test zones are defined. As a result, reliable checking of the detected lane marking along its course is ensured. The detected lane marking may be assigned to a lane marking category from a group of lane marking categories which includes the categories of "invalid image object", "single unbroken line", "double unbroken line", "single broken line", "double broken line", "broken and unbroken line", "wide broken line" and "line with surface profile". By this means, not only can actual lane markings be distinguished from artifacts, but also an associated driver assistance system can manage several lanes and in the process e.g. distinguish normal lanes from motorway exit lanes. In addition, haptic markings (Botts' dots), gaps between broken markings and the like objects that are difficult to detect can be handled.

According to another embodiment, at least 5 and preferably at least 10 different parameters are determined for the or each test zone, wherein in particular the detected lane markings are assigned to a lane marking category with the aid of a subgroup of parameters which is selected by a classification method. For instance, a classifier module can decide with the aid of several characteristics as a function of probability to which category the detected lane marking is to be assigned. This also allows division into categories with a similar curve pattern such as e.g. "single unbroken line" and "double unbroken line".

The classification method can use a neuronal network and/or a support vector machine. This enables "teaching" of the system, in order thus to manage a plurality of lane marking categories while processing a plurality of parameters and/or curve measures.

Another embodiment provides that respective parameters of several test zones of a detected lane marking at different distances from the vehicle and/or respective parameters of a single test zone in successive images are compared with each other. With the aid of the result of comparison, combined into a common parameter, wherein preferably with the aid of the result of comparison a degree of statistical confidence is calculated and assigned to the detected lane marking. Such an amalgamation allows checking of consistency, as a result of which the robustness of the method can be increased appreciably.

The teachings presented herein also relate to a computer program having program code means for carrying out a method as described above, when the computer program is run on a computer or a corresponding calculating unit.

Furthermore, the teachings presented herein also relate to a computer program product having program code means that are stored on a computer-readable data carrier, for carrying out a method as described above, when the computer program is run on a computer or a corresponding calculating unit.

The teachings presented herein also relate to a device for the detection and tracking of lane markings from a motor vehicle, having an image capture device mounted on the vehicle for taking a picture, and a data processing device that is designed to carry out the above-mentioned method.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
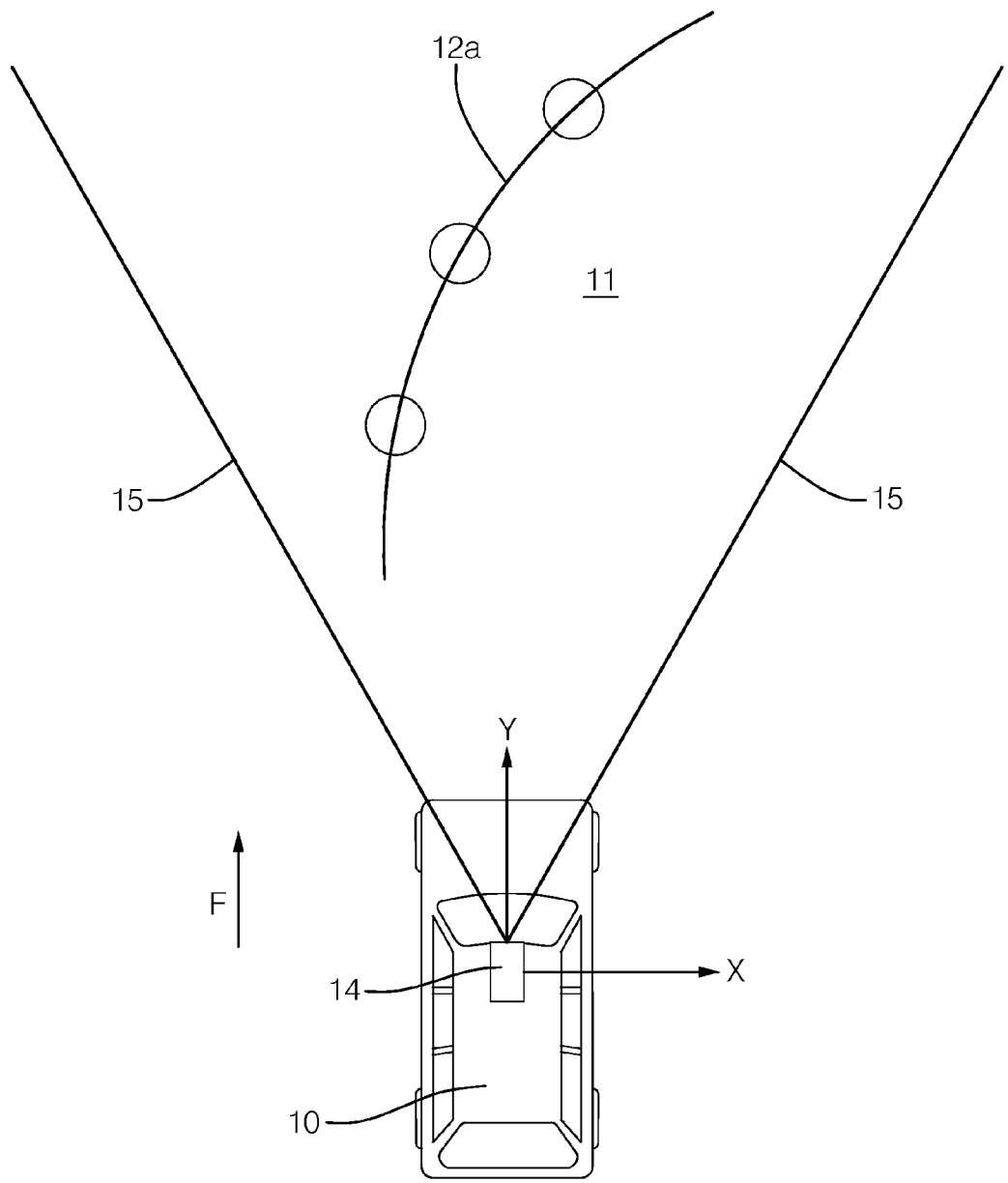
FIG. 1 is a top view of a traffic space occupied by a motor vehicle equipped with an image capture device for the detection and tracking of lane markings in accordance with one embodiment.

According to FIG. 1, a motor vehicle 10 is moving forwards in a direction of travel F in the lane 11 of a road. The lane 11 is defined by a left lane marking 12a in the form of an unbroken line and by a right lane marking, not shown. A camera 14 is mounted on the vehicle 10 at, for example, a front region of the vehicle, such as a roof lining of the vehicle interior. The camera 14 is generally configured to capture continuously an image (i.e. a sequence or series of image frames) of the space located in front of the vehicle 10, for example, the area between sight rays 15. The area viewed by the camera 14 may be characterized according to a world coordinate system having x and y distance values. Furthermore, the camera 14 is coupled to an image processing computer (not shown) to form an image processing system that is generally configured to process the images provided by the camera 14. The image processing computer may be housed within the camera 14, or may be located elsewhere in the vehicle 10.

Figure 2:
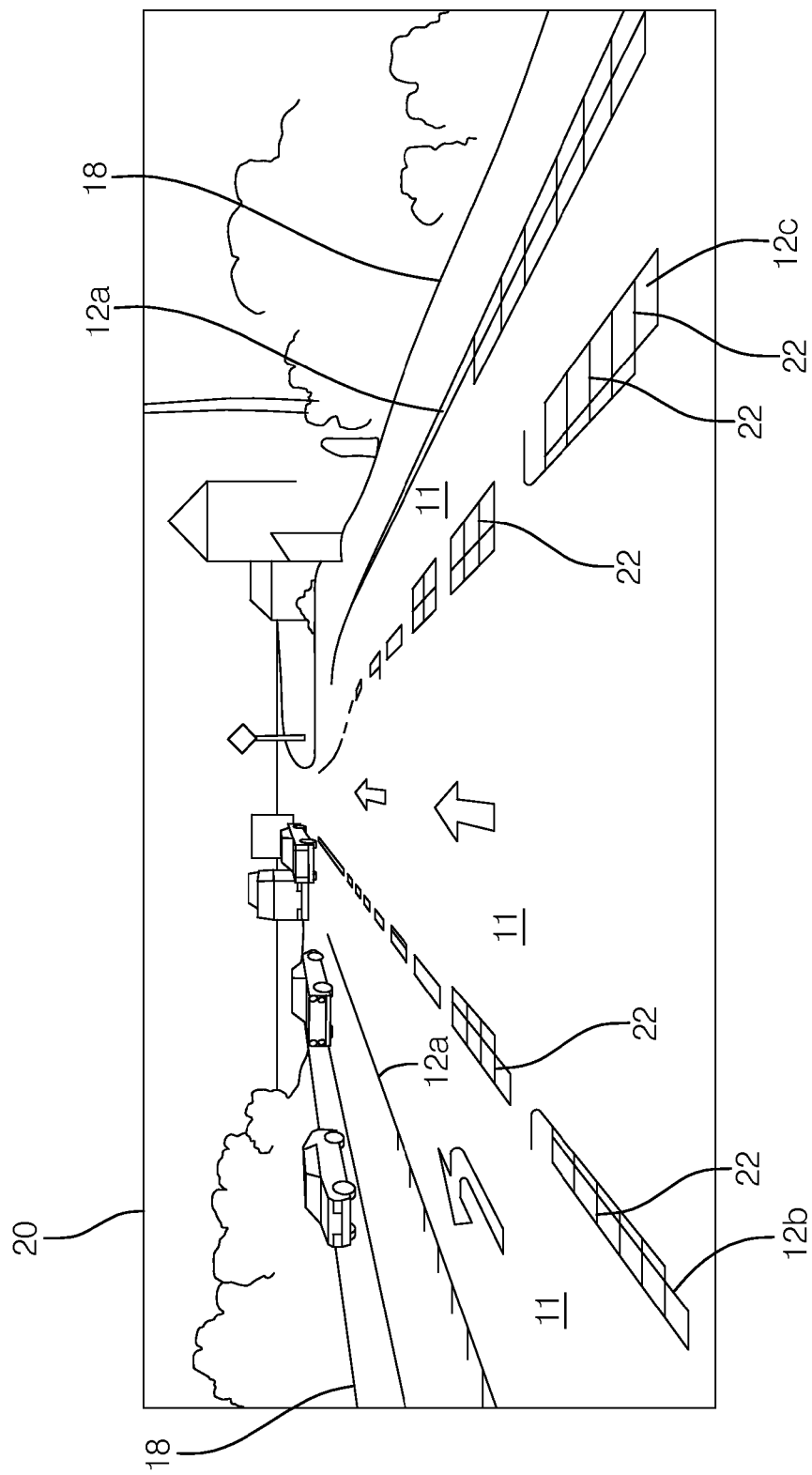
FIG. 2 is a first picture taken by the image capture device mounted on the vehicle as in FIG. 1 in accordance with one embodiment.
Figure 3:
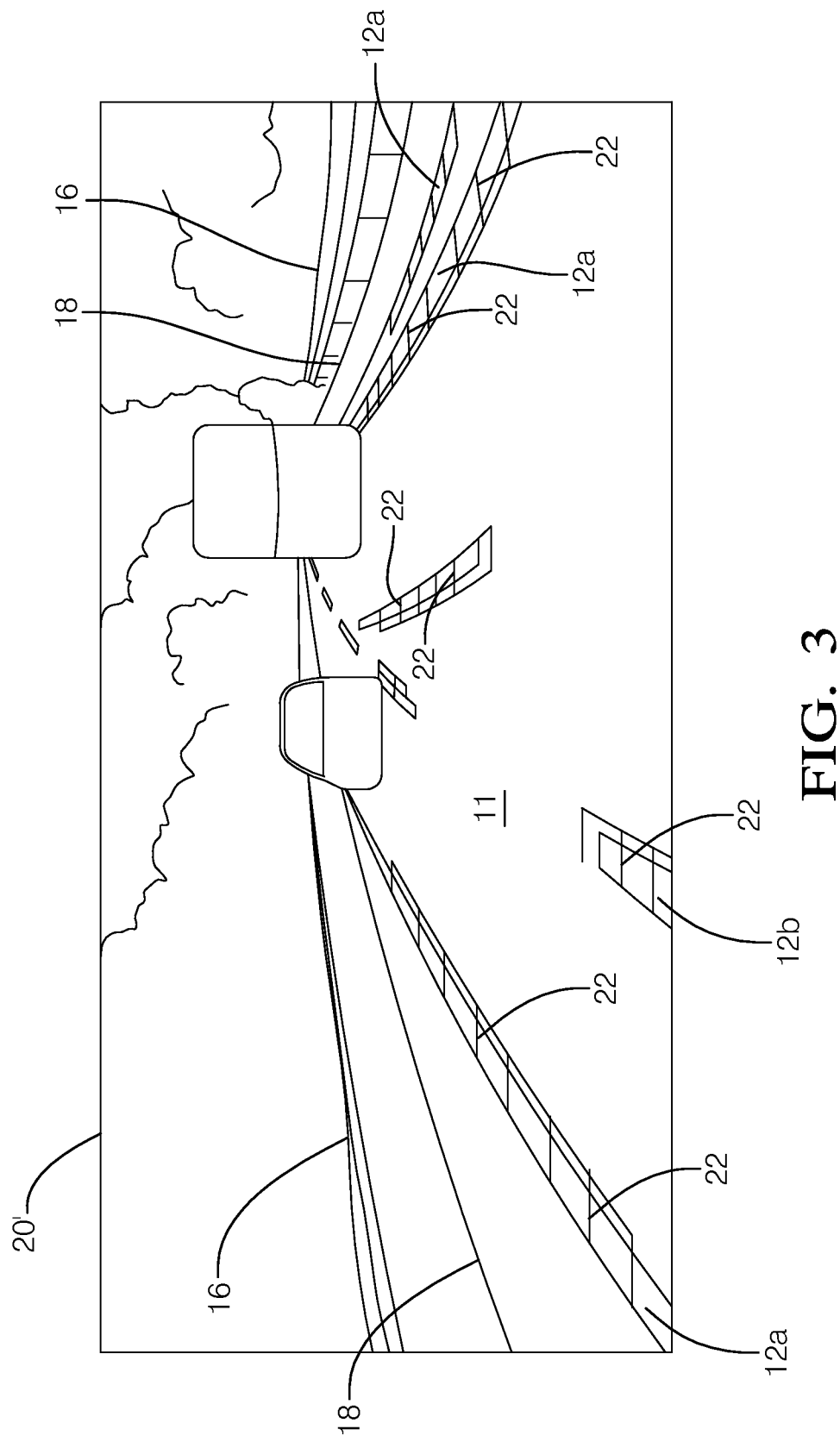
FIG. 3 is a second picture taken by an image capture device mounted on the vehicle as in FIG. 1 in accordance with one embodiment.

FIGS. 2 and 3 illustrate two non-limiting and simplified examples of images 20, 20' of the space located in front of the vehicle 10 are captured by the camera 14.

The camera 14 and the associated image processing computer form part of a driver assistance system such as, for example, a lane keeping support system or lane departure warning system (LDW). This system detects and tracks lane markings with the aid of the images captured by the camera 14 at regular intervals, as stated in more detail below.

First, by means of suitable image processing algorithms known in the field, all potential lane markings 12a, 12b, 12c, 16, 18 in a captured image 20, 20' are extracted or identified in the images. Image regions of the images that meet a predetermined detection criterion for lane markings are identified as detected lane markings. The lane markings detected in this way may be, for example, unbroken lines 12a, narrow broken lines 12b, wide broken lines 12c, crash barriers 16, or curbs 18. A verification and classification module (i.e. software or algorithm) associated with the image processing computer ensures that only valid lane markings 12a, 12b, 12c are tracked, and that the type of lane marking is taken into consideration during tracking.

For this purpose the verification and classification module defines for each of the detected lane markings (i.e. for each 'marking candidate') a set of twenty test zones 22 which in each case correspond to the position of a tracked lane marking 12a, 12b, 12c in the plane of the roadway at a certain distance from the vehicle 10. The position of the test zones 22 within the image 20, 20' is in each case determined by converting the position of a tracked lane marking 12a, 12b, 12c in the plane of the roadway into world coordinates x, y of the image. These world coordinates transform locations at predetermined distances from the vehicle 10 to image coordinates by means of suitable projection equations. Each test zone 22 comprises several pixels of the image 20, 20' and extends over a certain region within the lane marking 12a, 12b, 12c, and if occasion arises, into the surrounding area. For each test zone 22 a set of various statistical parameters is determined from the greyscale values of the pixel concerned, for example an average greyscale value, a maximum greyscale value, a minimum greyscale value and/or different moments of greyscale value distribution. These statistical parameters form characteristics or descriptors that are assigned to the respective candidate for lane markings.

Each of the parameters is determined for all of the images 20, 20' succeeding each other in time and processed as a function of time. As the current speed of the vehicle 10 is determined, the functions of time can be converted to functions of the distance covered. The functions of distance covered that are obtained constitute the curve of the parameters in space in the plane of the roadway. For description of the functions, subsequently a set of statistical curve measures is determined, such as for example, average or standard deviation.

In addition the curve of the parameters in time is subjected to a Haar transform, wherein the Haar coefficients obtained in the process are also assigned to the set of curve measures.

For each test zone 22 there are now a plurality of extracted characteristics in the form of parameters and curve measures, which in their entirety characterize relatively precisely the optical appearance of the lane marking concerned and in particular its variation in time or variation over time. A classifier now selects certain characteristics from the plurality of characteristics, using a neuronal network and/or a support vector machine, and assigns the detected lane marking to one of several lane marking categories with the aid of the values of the selected characteristics. Specifically, the classifier decides whether the detected lane marking is an invalid image object such as a crash barrier 16 or a curb 18, an unbroken line 12a, a narrow broken line 12b or a wide broken line 12c. It should be pointed out that the method described makes it possible to distinguish between many further common types of marking such as, for example, double broken lines, broken and unbroken line and lines with a surface profile (Botts' dots).

To make the classification which is carried out more robust, an amalgamation can be made by comparing respective parameters of several test zones 22 of a detected lane marking at different distances from the vehicle 10 and respective parameters of a single test zone 22 in successive images 20, 20' with each other, and with the aid of the result of comparison combining them into a common parameter. If, for example, nineteen parameters indicate a curb for a lane marking and one parameter indicates a broken line, the last-mentioned value is rejected as an error and the lane marking is classed as a curb. Further, a degree of statistical confidence is calculated and also assigned to the detected lane marking. A particular advantage of the invention lies in that the classifier can be taught.

Figure 4:
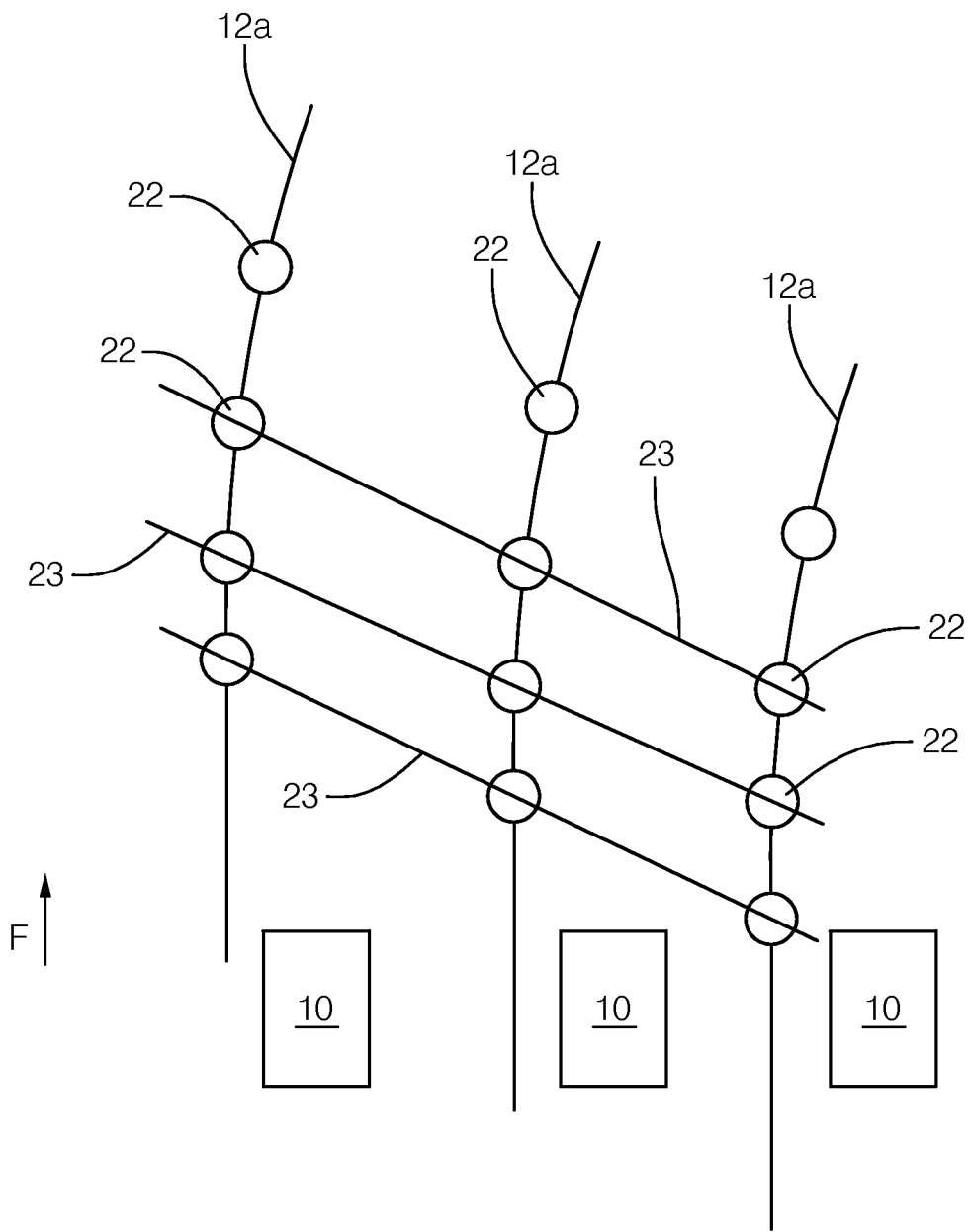
FIG. 4 is a lane marking at three successive points in time during the travel of the vehicle as in FIG. 1 in accordance with one embodiment.

Within the scope of the amalgamation described above, the results of the previous time step are shifted by the distance covered and compensated with the current positions. Thus, compensation of the vehicle's own movement is carried out during amalgamation. The robustness of this method has its effect particularly in the regions located close to the vehicle 10, as these positions are observed repeatedly. The amalgamation in combination with compensation of the vehicle's own movement is illustrated in FIG. 4, wherein corresponding test zones 22 are connected by lines 23.

Preferably a time signal is formed by means of the classification results for a fixed particular location in world coordinates x, y. The results of classification are then shifted by means of compensation of the vehicle's own movement, and the results are amalgamated for a certain point in the world. This is preferably carried out recursively.

All detected lane markings which are classified by the classifier as valid lane markings 12a, 12b, 12c are, as lane markings to be tracked, subjected to a tracking process in which the variation of the course of the lane markings 12a, 12b, 12c in time in the plane of the roadway is tracked by means of a status estimator. The detected lane markings which are classified as "invalid lane markings" 16, 18 by the classifier are, on the other hand, rejected, that is, not tracked.

Actual tracking of the variation of the course of the lane markings 12a, 12b, 12c in time is preferably carried out by an independent module and takes place by means of a status estimator that is based on an extended Kalman filter.

The invention enables robust lane detection even in complex traffic situations such as the town traffic situation shown in FIG. 2 or the building site situation shown in FIG. 3, wherein several lanes 11 can be handled safely as well.

While this invention has been described in terms of the preferred embodiments thereof, it is not intended to be so limited, but rather only to the extent set forth in the claims that follow.

We claim:

1. A system for the detection and tracking of lane markings proximate to a motor vehicle, said system comprising:
   an image capture device mounted on the motor vehicle and configured to capture an image of a space located in front of the vehicle, wherein the image includes a plurality of picture elements, the image is captured by the image capture device at regular intervals,
   the picture elements that meet a predetermined detection criterion are identified as detected lane markings in the image,
   at least one detected lane marking identified as a lane marking to be tracked is subjected to a tracking process in which the variation of the course of the lane marking in time in the plane of the roadway is tracked,
   at least one test zone comprising a plurality of picture elements of the image is defined for each detected lane marking,
   with the aid of intensity values of the picture elements associated with the test zone, at least one parameter is determined, and
   the detected lane marking is assigned to one of a plurality of lane marking categories, depending on the parameter, wherein from the intensity values of the picture elements associated with the test zone statistical parameters are determined that include an average intensity value, an intensity value total, a maximum intensity value, a minimum intensity value, and a moment of intensity value distribution of the picture elements.

2. The system according to claim 1, wherein each detected lane marking is subjected to the tracking process as a lane marking to be tracked or rejected as an invalid lane marking, depending on the lane marking category to which it is assigned.

3. The system according to claim 1, wherein the position of the test zone within the image is determined by converting the position of a tracked lane marking in the plane of the roadway at a predetermined distance from the vehicle to image coordinates by a projection method.

4. The system according to claim 1, wherein the parameter for a plurality of successive images is determined, and the detected lane marking is assigned to the lane marking category in addition with the aid of the curve of the parameter in time.

5. The system according to claim 4, wherein the current speed of the vehicle is determined and with the aid of the speed the curve of the parameter in time is converted to a curve of the parameter in space in the plane of the roadway, and wherein the detected lane marking is assigned to the lane marking category with the aid of the curve of the parameter in space.

6. The system according to claim 4, wherein for characterization of the curve of the parameter in time, a statistical curve measure is determined, wherein the detected lane marking is assigned to the lane marking category with the aid of the statistical curve measure.

7. The system according to claim 4, wherein the curve of the parameter in time is subjected to a time-frequency transform, wherein the detected lane marking is assigned to the lane marking category with the aid of the transform coefficients determined within the framework of the time-frequency transform.

8. The system according to claim 7, wherein the time-frequency transform is carried out iteratively.

9. The system according to claim 1, wherein for each detected lane marking there is defined a set of a plurality of test zones which in each case correspond to the position of a tracked lane marking in the plane of the roadway at different distances from the vehicle.

10. The system according to claim 9, wherein for each detected lane marking at least five test zones are defined.

11. The system according to claim 1, wherein the detected lane marking is assigned to a lane marking category from a group of lane marking categories that includes the categories of "invalid image object", "single unbroken line", "double unbroken line", "single broken line", "double broken line", "broken and unbroken line", "wide broken line" and "line with surface profile".

12. The system according to claim 1, wherein respective parameters of a plurality of test zones of a detected lane marking at different distances from the vehicle and respective parameters of a single test zone in successive images are compared with each other and, with the aid of the result of comparison, combined into a common parameter.

13. The system according to claim 12, wherein with the aid of the result of comparison a degree of statistical confidence is calculated and assigned to the detected lane marking.

14. A method for the detection and tracking of lane markings by an image capture device mounted on a motor vehicle, said method comprising:
   capturing an image of a space located in front of the vehicle with the image capture device, wherein said image comprises a plurality of picture elements captured by the image capture device at regular time intervals;
   identifying picture elements that meet a predetermined detection criterion as detected lane markings in the captured image by means of an image processing system;
   indicating at least one detected lane marking as a lane marking to be tracked according to a tracking process in which the variation of the course of the lane marking over time in the plane of the roadway is tracked by means of a status estimator of the image processing system;
   defining for each detected lane marking a test zone comprising a plurality of picture elements;
   determining statistical parameters based on an intensity value of the picture elements associated with the test zone, wherein the statistical parameters include an average intensity value, an intensity value total, a maximum intensity value, a minimum intensity value, and a moment of intensity value distribution of the picture elements; and
   assigning the detected lane marking to one of a plurality of lane marking categories based on the parameter.

15. The method according to claim 14, wherein each detected lane marking is subjected to the tracking process as a lane marking to be tracked or rejected as an invalid lane marking, depending on the lane marking category to which it is assigned.

16. The method according to claim 14, wherein the parameter for a plurality of successive images is determined, and the detected lane marking is assigned to the lane marking category in addition with the aid of the curve of the parameter in time.

17. The method according to any of claim 16, wherein the curve of the parameter in time is subjected to a time-frequency transform, wherein the detected lane marking is assigned to the lane marking category with the aid of the transform coefficients determined within the framework of the time-frequency transform.

18. The method according to claim 14, wherein for each detected lane marking there is defined a set of a plurality of test zones which in each case correspond to the position of a tracked lane marking in the plane of the roadway at different distances from the vehicle.

19. The method according to claim 14, wherein the detected lane marking is assigned to a lane marking category from a group of lane marking categories that includes the categories of "invalid image object", "single unbroken line", "double unbroken line", "single broken line", "double broken line", "broken and unbroken line", "wide broken line" and "line with surface profile".

20. The method according to claim 14, wherein respective parameters of a plurality of test zones of a detected lane marking at different distances from the vehicle and respective parameters of a single test zone in successive images are compared with each other and, with the aid of the result of comparison, combined into a common parameter.

* * * * *